United States Patent [19]

Martin

[11] Patent Number: 4,852,196
[45] Date of Patent: Aug. 1, 1989

[54] COMBINATION DRILL AND SCREWDRIVER

[75] Inventor: Ronald L. Martin, Bristol, Wis.

[73] Assignee: Honeywell Inc., Minneapolis, Minn.

[21] Appl. No.: 220,201

[22] Filed: Jul. 18, 1988

[51] Int. Cl.⁴ .............................................. B25B 15/00
[52] U.S. Cl. ........................................ 7/165; 408/224
[58] Field of Search .................... 7/158, 165; 408/224, 408/225

[56] References Cited

U.S. PATENT DOCUMENTS

| | | | |
|---|---|---|---|
| 2,978,846 | 4/1961 | Barron | 408/224 X |
| 3,207,196 | 9/1965 | Stillwagon | 7/165 X |
| 3,763,510 | 10/1973 | Graham | 7/158 |
| 3,869,741 | 3/1975 | Logan | 7/158 |
| 4,079,766 | 3/1978 | Conley et al. | 408/224 X |
| 4,092,753 | 6/1978 | Fuhrmann | 7/165 X |
| 4,093,395 | 6/1978 | Luebbert et al. | 408/224 |
| 4,505,626 | 3/1985 | Benhase | 408/224 |
| 4,512,691 | 4/1985 | Dicke . | |
| 4,512,693 | 4/1985 | Swanson | 7/165 X |
| 4,710,075 | 12/1987 | Davison . | |

Primary Examiner—James G. Smith
Attorney, Agent, or Firm—Donald J. Lenkszus

[57] ABSTRACT

A combination drill and screwdriver device for use in forming holes in wallboard material or the like and for driving screws. A Phillips head screwdriver bit is modified for use in forming pilot holes for screw anchors and for a counterbore. A sleeve surrounding the bit provides a drill stop when drilling holes for screw anchors. The sleeve may be pushed through the pilot hole to position a counterbore used for forming larger holes.

4 Claims, 1 Drawing Sheet

COMBINATION DRILL AND SCREWDRIVER

BACKGROUND OF THE INVENTION

The present invention relates to a combination drill and screwdriver bit.

Room thermostat installation typically requires the drilling of holes to receive screw anchors to be used with screws for securing a thermostat backplate, the drilling of a larger hole to allow connection of the backplate to pneumatic tubing or wiring, and the driving of screws into the screw anchors to secure the backplate. In the past, this procedure required the worker to handle several tools including a drill bit for forming the holes for the screw anchors, a larger drill bit for forming a hole for a connection to the tubing or wiring, and a screwdriver bit for driving the screws into the screw anchors to secure the backplate.

Commercial buildings typically require numerous thermostats, and the past procedure was time-intensive. A time saving of minutes or even seconds for each thermostat installed is significant in commercial buildings. Thus, a need exists in the field of hole-forming and screwdriving devices that does not require the use of separate drill bits and screwdriver bits. Further, a need exists for a device that is simple, easy to use, and time-efficient in forming the holes and driving the screws for installing thermostat backplates.

SUMMARY OF THE INVENTION

The present invention is directed to a combination device for use with a rotary drill to form holes of two different sizes in wallboard and to drive Phillips head type screws.

In accordance with the principles of the invention, the device includes a bit terminating in a cross recessed type driver tip, reliefs on the shank adjacent to the tip to relieve wallboard material during the forming of the smaller sized hole, a sleeve surrounding the bit to limit penetration, and a counterbore section mounted on the sleeve for forming the larger size hole.

BRIEF DESCRIPTION OF THE DRAWINGS

The invention may be best understood from a reading of the following detailed description with the drawings in which.

DESCRIPTION OF THE PREFERRED EMBODIMENTS

Figure 3:
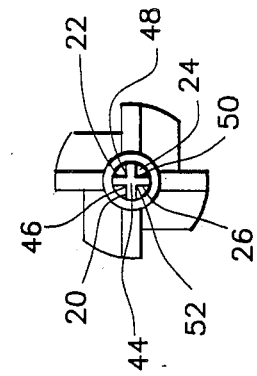
FIG. 3 is an end view of the device of FIG. 2 in the direction of arrow A.
Figure 1:
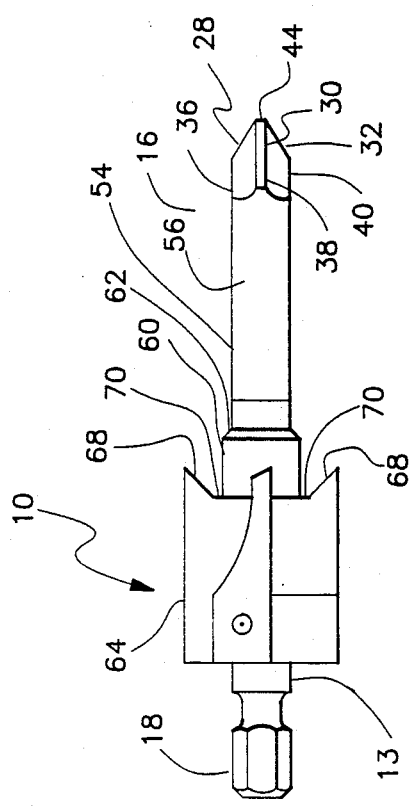
FIG. 1 is a front plan view of the device.
Figure 2:
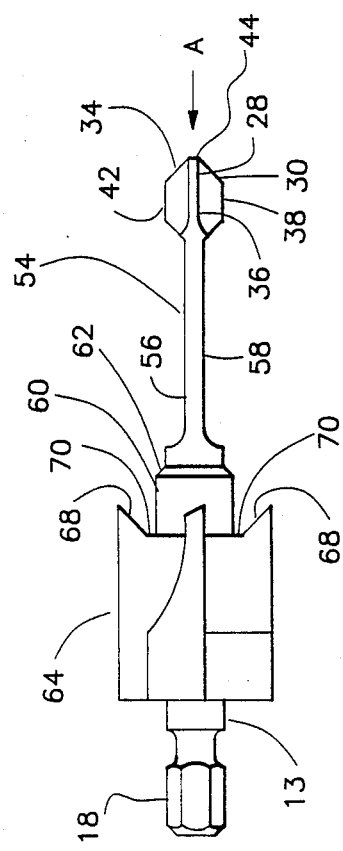
FIG. 2 is an elevation of the device.

In accordance with the invention, a combination drill and screwdriver 10 includes a core 13 having a cross-recessed or Phillips type head on the forward end 16. The rearward end 18 is to be chucked into a drill.

The Phillips type head includes wings 20, 22, 24, and 26 each including a first wing portion 28, 30, 32, and 34 and a second wing portion 36, 38, 40, and 42, respectively. The first portions converge at 44, and the wings are oriented longitudinally to the axis of the device and at right angles to each other in the generally known manner of a Phillips head screwdriver. Valleys 46, 48, 50, and 52 are formed in the area defined by the sides of the wings.

The core 13 includes a shank section 54 adjacent the Phillips type head. Shank section 54 has flat sections 56 and 58. Flats 56 and 58 may be formed by grinding away portions of core 13.

Sleeve 60 surrounds central core 13 and is spaced from the forward end 16. Sleeve 60 has a first end 62 which forms an annular surface around core 13.

A counterbore 64 is secured on sleeve 60 and includes cutting points 68 and abrading surfaces 70.

Device 10 may be used to form holes of a first diameter and holes of a second diameter in wallboard. To form holes having a first diameter, end 18 of device 10 is held in a drill chuck. End 16 is positioned against wallboard. As device 10 is rotated and forced against the wallboard, the edges of wings 20, 22, 24, and 26 abrade away the wallboard material. The abraded wallboard material will be relieved through valleys 46, 48, 50, and 52 and by flats 56 and 58 which are in communication with the valleys. After the wings 20, 22, 24, and 26 have penetrated through the wallboard, the penetration of device 10 will be stopped when the annular surface formed by end 62 of sleeve 60 contacts the wallboard.

To form a hole having a second diameter, the procedure is as described above and in addition includes applying additional force to push sleeve 60 through the first hole. Counterbore 64 may then be positioned with cutters 68 at the wallboard surface. As device 10 is rotated, counterbore 64 is forced against the wallboard surface. Cutters 68 will then cut through the paper outer surface of the wallboard, and abrading edges 70 will remove wallboard material. The cutters 68 will eventually cut through the inner surface of the wallboard and the hole will be formed.

The use and advantages of device 10 may be illustrated by describing its use for the mounting of a thermostat backplate on the wallboard of hollow wall-type construction. The procedure is as follows:

chucking rearward end 18 of device 10 into a drill;

using the Phillips tip of the forward end 16 to form two holes of a first diameter in the wallboard for the receipt of screw anchors, with end 62 of sleeve 60 stopping the penetration of forward end 16 after each hole is formed;

using the Phillips head to form one hole having a first diameter and then forcing end 62 of sleeve 60 through this hole to position counterbore 64 to form a hole of a second diameter to allow piping or wiring within the wall to be connected to the backplate;

inserting screw anchors into the two holes;

using the Phillips head of device 10 to drive screws into the screw anchors to secure the backplate to the wall.

What is claimed is:

1. A combination device for use with a drive means for forming holes in wallboard material and the like and for driving screws, said device comprising:

an elongated core having a forward end, and a rearward end;

means for forming a first hole, said means having a plurality of equally spaced wings formed on said forward end, said wings separated by valleys, each said wing having a first portion extending radially outwardly and away from said forward end and each said wing having a second portion extending rearwardly from said first portion, the junction of each said first wing portion and each said valley forming an abrading edge for removing wallboard material when said device is rotated and is pressed with a first axial force directly into engagement with wallboard and rotated to form a first hole having a first diameter;

stop means for resisting further penetration by said core into said wallboard when said first axial force is applied to said device, said stop means comprising an annular surface extending radially outwardly from said core, said annular surface spaced a first distance from said forward end;

a shank section between said first hole forming means and said annular surface, a portion of said shank section having a reduced cross section for relieving abraded wallboard material when forming said first hole;

a counterbore surrounding said core and axially displaced rearwardly from said annular surface, said counterbore for forming a second hole having a second diameter; said stop means being pushable through said wallboard when said device is subjected to a second axial force, whereby said counterbore engages said wallboard to form said second hole; and means formed on said rearward end for connection to said drive means.

2. The device of claim 1 wherein said annular surface is beveled radially outwardly and rearwardly, said bevel permitting said surface to be more easily pushed through the first hole.

3. The device of claim 1 wherein said counterbore comprises at least one outwardly extending abrading surface terminating in a cutting point.

4. The device of claim 2 wherein said counterbore comprises at least one outwardly extending abrading surface terminating in a cutting point.

* * * * *